(12) United States Patent
Zellner et al.

(10) Patent No.: US 7,941,468 B2
(45) Date of Patent: May 10, 2011

(54) INFRINGER FINDER

(75) Inventors: Samuel N. Zellner, Dunwoody, GA (US); Scott Frank, Dunwoody, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 509 days.

(21) Appl. No.: 11/026,737

(22) Filed: Dec. 30, 2004

(65) Prior Publication Data

US 2006/0149711 A1    Jul. 6, 2006

Related U.S. Application Data

(63) Continuation-in-part of application No. 10/188,209, filed on Jul. 3, 2002, now Pat. No. 7,386,460, which is a continuation of application No. 10/004,497, filed on Dec. 6, 2001, now abandoned, which is a continuation of application No. 09/750,012, filed on Dec. 29, 2000, now abandoned, application No. 11/026,737, which is a continuation-in-part of application No. 09/750,154, filed on Dec. 29, 2000, now Pat. No. 7,346,518, application No. 11/026,737, which is a continuation-in-part of application No. 09/946,457, filed on Sep. 6, 2001, now Pat. No. 7,389,239, which is a continuation of application No. 09/750,000, filed on Dec. 29, 2000, now abandoned, application No. 11/026,737, which is a continuation-in-part of application No. 09/750,130, filed on Dec. 29, 2000, now Pat. No. 7,127,405, application No. 11/026,737, which is a continuation-in-part of application No. 09/750,001, filed on Dec. 29, 2000, now Pat. No. 7,801,830, application No. 11/026,737, which is a continuation-in-part of application No. 09/946,593, filed on Sep. 6, 2001, now Pat. No. 7,406,425, which is a continuation of application No. 09/750,136, filed on Dec. 29, 2000, now abandoned.

(60) Provisional application No. 60/173,919, filed on Dec. 30, 1999, provisional application No. 60/192,862, filed on Mar. 29, 2000.

(51) Int. Cl.
*G06F 17/30* (2006.01)

(52) U.S. Cl. ...................................................... 707/932

(58) Field of Classification Search ................ 707/1, 932
See application file for complete search history.

(56) References Cited

U.S. PATENT DOCUMENTS 5,208,765 A    5/1993    Turnbull
(Continued)

FOREIGN PATENT DOCUMENTS

WO    WO 01/08031 A2    2/2001
(Continued)

OTHER PUBLICATIONS

Bates, Using Dialog's Intranet Toolkit to Mine for Patent Intelligence; Quantum2 Leadership Series, Jan. 2, 2002, pp. 1-4.*

(Continued)

*Primary Examiner* — Cheyne D Ly
(74) *Attorney, Agent, or Firm* — Hope Baldauff Hartman, LLC

(57) ABSTRACT

The present disclosure provides systems and methods for an infringer finder to search public information sources for possible patent infringers. Some embodiments provide for analyzing an issued patent, associated patent support data, such as Patent and Trademark Office (PTO) information, and other reference materials, along with user input to create a patent search profile. Using the patent search profile, a search is made of public information sources and a report is generated summarizing possible patent infringement targets.

18 Claims, 8 Drawing Sheets

U.S. PATENT DOCUMENTS

| | | | |
|---|---|---|---|
| 5,526,257 A | 6/1996 | Lerner | |
| 5,692,206 A | 11/1997 | Shirley et al. | |
| 5,754,840 A | 5/1998 | Rivette et al. | 395/602 |
| 5,774,833 A | 6/1998 | Newman | 704/9 |
| 5,917,912 A | 6/1999 | Ginter et al. | |
| 5,991,751 A | 11/1999 | Rivette et al. | |
| 6,014,663 A | 1/2000 | Rivette et al. | 707/4 |
| 6,044,354 A | 3/2000 | Asplen | |
| 6,049,811 A | 4/2000 | Petruzzi et al. | |
| 6,061,660 A | 5/2000 | Eggleston et al. | |
| 6,067,531 A | 5/2000 | Hoyt et al. | |
| 6,236,977 B1 | 5/2001 | Verba et al. | |
| 6,263,314 B1 | 7/2001 | Donner | 705/1 |
| 6,289,341 B1* | 9/2001 | Barney | 707/6 |
| 6,298,327 B1 | 10/2001 | Hunter et al. | |
| 6,321,983 B1 | 11/2001 | Katayanagi et al. | |
| 6,339,767 B1 | 1/2002 | Rivette et al. | 707/2 |
| 6,345,239 B1 | 2/2002 | Bowman-Amuah | |
| 6,389,418 B1 | 5/2002 | Boyack et al. | 707/6 |
| 6,389,538 B1 | 5/2002 | Gruse et al. | |
| 6,452,613 B1 | 9/2002 | Lefebvre et al. | 345/733 |
| 6,499,026 B1 | 12/2002 | Smith et al. | 707/2 |
| 6,542,871 B1 | 4/2003 | Harshaw | |
| 6,556,992 B1 | 4/2003 | Barney et al. | 707/6 |
| 6,571,241 B1 | 5/2003 | Nosohara | 707/6 |
| 6,662,178 B2 | 12/2003 | Lee | 707/3 |
| 6,665,670 B2 | 12/2003 | Winer et al. | 707/6 |
| 6,694,331 B2 | 2/2004 | Lee | 707/104.1 |
| 6,731,826 B1 | 5/2004 | Yamamoto et al. | 382/305 |
| 6,850,935 B1 | 2/2005 | Ponte | 707/6 |
| 7,127,405 B1 | 10/2006 | Frank et al. | |
| 7,346,518 B1 | 3/2008 | Frank et al. | |
| 7,386,460 B1 | 6/2008 | Frank et al. | |
| 7,389,239 B1 | 6/2008 | Frank et al. | |
| 7,406,425 B1 | 7/2008 | Frank et al. | |
| 7,653,554 B2 | 1/2010 | Frank et al. | |
| 2001/0010041 A1 | 7/2001 | Harshaw | |
| 2001/0018178 A1 | 8/2001 | Siefert | |
| 2001/0032189 A1 | 10/2001 | Powell | |
| 2001/0041989 A1 | 11/2001 | Vilcauskas et al. | |
| 2001/0049707 A1* | 12/2001 | Tran | 707/530 |
| 2002/0032659 A1 | 3/2002 | Waters | |
| 2002/0072995 A1 | 6/2002 | Smith | |
| 2002/0077835 A1 | 6/2002 | Hagelin | |
| 2002/0095368 A1 | 7/2002 | Tran | |
| 2002/0138297 A1* | 9/2002 | Lee | 705/1 |
| 2002/0178120 A1 | 11/2002 | Reid | |
| 2003/0046307 A1* | 3/2003 | Rivette et al. | 707/104.1 |
| 2003/0171949 A1 | 9/2003 | Degnan | |
| 2003/0172020 A1* | 9/2003 | Davies et al. | 705/36 |
| 2003/0191780 A1* | 10/2003 | Heger et al. | 707/104.1 |
| 2004/0054606 A1 | 3/2004 | Broerman | |
| 2004/0059994 A1* | 3/2004 | Fogel et al. | 715/500 |
| 2004/0220881 A1 | 11/2004 | Powell | |
| 2005/0021384 A1 | 1/2005 | Pantaleo et al. | |
| 2005/0210009 A1* | 9/2005 | Tran | 707/3 |
| 2006/0080135 A1 | 4/2006 | Frank et al. | |
| 2006/0080136 A1 | 4/2006 | Frank et al. | |
| 2006/0085219 A1 | 4/2006 | Frank et al. | |
| 2006/0085220 A1 | 4/2006 | Frank et al. | |
| 2006/0224412 A1 | 10/2006 | Frank et al. | |
| 2006/0259321 A1 | 11/2006 | Gabrick et al. | |
| 2006/0277091 A1 | 12/2006 | Kochikar et al. | |
| 2007/0073625 A1 | 3/2007 | Shelton | |
| 2007/0226094 A1 | 9/2007 | Malackowski et al. | |
| 2008/0133338 A1 | 6/2008 | Frank et al. | |
| 2008/0154682 A1 | 6/2008 | Frank et al. | |
| 2008/0201210 A1 | 8/2008 | Frank et al. | |
| 2008/0201211 A1 | 8/2008 | Frank et al. | |
| 2009/0083109 A1 | 3/2009 | Frank et al. | |
| 2010/0332285 A1 | 12/2010 | Dunagan et al. | |

FOREIGN PATENT DOCUMENTS

| | | |
|---|---|---|
| WO | WO 01/24035 | 5/2001 |

OTHER PUBLICATIONS

The Dialog Corporation; Search Aid: Dialog Intranet Tookit; pp. 1-7, 2001.*

Thomson Dialog, Dialog Intranet Toolkit, Instructional Guide, pp. 1-25, 1999.*

McQueen et al., Technovation, vol. 23, 2003, pp. 533-544.*

Ganguli et al.; World Patent Information, vol. 17, No. 4, pp. 245-256, 1995.*

Daukuviene et al., World Patent Information, vol. 19, No. 1, pp. 41-46, 1997.*

Schoch-Grubler, U., World Patent Information, vol. 20, No. 1, pp. 21-27, 1998.*

Frank; U.S. Appl. No. 11/395,088, filed Mar. 31, 2006.

Berkowitz, "Getting the most from your Patents," *Research-Technology Management*, 32(2): 26-31, Mar./Apr. 1993.

Bjorner, "Patent and Trademark Databases: Intellectual property for the masses (includes related article (Focus: Intellectual Property)," *Link-Up*, 9(4), 14 pages, Jul.-Aug. 1992.

Dictionary.com. *Intellectual Property* definition, printed May 24, 2005.

Hufker et al., "Patents: A Managerial Perspective," *Journal of Product & Brand Management*, 3(4): 44-54, 1994.

Iandiorio, "Patents and Copyrights: Protecting Intellectual Property," *Microwave Journal*, 35(4):30-37, Apr. 1991.

Kempner, et al., "Many a slip," *Managing Intellectual Property*, 7(42):15-26, Sep. 1994.

Kimmerling, "A Licensing Primer for Trainers," *Training & Development*, 51(1):30-35, Jan. 1997.

Murray, "HR Takes Steps to Protect Trade Secrets," *Personal Journal*, 73(6):98-109, Jun. 1994.

Wineburg, et al. "Managing Intellectual Property—An international capital asset," *Commercial Law Journal*, 99(3):366-383, Fall 1994.

"The Evolution of the Post-it® Note," www.3m.com/us/office/postit/pastpresent/history_t1.html, printed Apr. 16, 2007, 2 pages.

U.S. Official Action dated Sep. 21, 2004 in U.S. Appl. No. 09/750,001.

U.S. Official Action dated May 31, 2005 in U.S. Appl. No. 09/750,001.

U.S. Official Action dated Jan. 27, 2006 in U.S. Appl. No. 09/750,001.

U.S. Official Action dated Aug. 7, 2006 in U.S. Appl. No. 09/750,001.

U.S. Official Action dated May 7, 2007 in U.S. Appl. No. 09/750,001.

U.S. Official Action dated Sep. 26, 2007 in U.S. Appl. No. 09/750,001.

U.S. Official Action dated Mar. 21, 2008 in U.S. Appl. No. 09/750,001.

U.S. Official Action dated Aug. 6, 2008 in U.S. Appl. No. 09/750,001.

U.S. Official Action dated Jan. 27, 2009 in U.S. Appl. No. 09/750,001.

U.S. Official Action dated May 11, 2009 in U.S. Appl. No. 09/750,001.

U.S. Official Action dated Sep. 3, 2004 in U.S. Appl. No. 09/750,130.

U.S. Notice of Allowance/Allowability dated Feb. 7, 2006 in U.S. Appl. No. 09/750,130.

U.S. Notice of Allowance/Allowability dated Aug. 18, 2006 in U.S. Appl. No. 09/750,130.

U.S. Official Action dated Sep. 10, 2004 in U.S. Appl. No. 09/750,154.

U.S. Official Action dated Jun. 8, 2005 in U.S. Appl. No. 09/750,154.

U.S. Official Action dated Jan. 31, 2006 in U.S. Appl. No. 09/750,154.

U.S. Official Action dated Aug. 7, 2006 in U.S. Appl. No. 09/750,154.

U.S. Notice of Allowance/Allowability dated May 8, 2007 in U.S. Appl. No. 09/750,154.

U.S. Official Action dated Aug. 17, 2007 in U.S. Appl. No. 09/750,154.

U.S. Official Action dated Sep. 7, 2004 in U.S. Appl. No. 09/946,457.

U.S. Official Action dated Feb. 2, 2006 in U.S. Appl. No. 09/946,457.

U.S. Official Action dated Aug. 7, 2006 in U.S. Appl. No. 09/946,457.

U.S. Notice of Allowance/Allowability dated May 4, 2007 in U.S. Appl. No. 09/946,457.

U.S. Notice of Allowance/Allowability dated Feb. 14, 2008 in U.S. Appl. No. 09/946,457.

U.S. Official Action dated Jul. 31, 2002 in U.S. Appl. No. 09/946,593.
U.S. Official Action dated Nov. 21, 2002 in U.S. Appl. No. 09/946,593.
U.S. Official Action dated Apr. 3, 2003 in U.S. Appl. No. 09/946,593.
U.S. Official Action dated Sep. 30, 2003 in U.S. Appl. No. 09/946,593.
U.S. Official Action dated Jul. 27, 2004 in U.S. Appl. No. 09/946,593.
U.S. Official Action dated May 31, 2005 in U.S. Appl. No. 09/946,593.
U.S. Official Action dated Jan. 27, 2006 in U.S. Appl. No. 09/946,593.
U.S. Official Action dated Aug. 7, 2006 in U.S. Appl. No. 09/946,593.
U.S. Notice of Allowance/Allowability dated May 8, 2007 in U.S. Appl. No. 09/946,593.
U.S. Notice of Allowance/Allowability dated Mar. 25, 2008 in U.S. Appl. No. 09/946,593.
U.S. Official Action dated Sep. 10, 2004 in U.S. Appl. No. 10/188,209.
U.S. Official Action dated Jun. 8, 2005 in U.S. Appl. No. 10/188,209.
U.S. Official Action dated Jan. 31, 2006 in U.S. Appl. No. 10/188,209.
U.S. Official Action dated Aug. 8, 2006 in U.S. Appl. No. 10/188,209.
U.S. Official Action dated Apr. 18, 2007 in U.S. Appl. No. 10/188,209.
U.S. Official Action dated Aug. 21, 2007 in U.S. Appl. No. 10/188,209.
U.S. Notice of Allowance/Allowability dated Oct. 19, 2007 in U.S. Appl. No. 10/188,209.
U.S. Official Action dated Sep. 26, 2007 in U.S. Appl. No. 11/289,859.
U.S. Official Action dated Mar. 13, 2008 in U.S. Appl. No. 11/289,859.
U.S. Official Action dated Jul. 25, 2008 in U.S. Appl. No. 11/289,859.
U.S. Official Action dated Jan. 12, 2009 in U.S. Appl. No. 11/289,859.
U.S. Official Action dated Jul. 6, 2009 in U.S. Appl. No. 11/289,859.
U.S. Official Action dated Sep. 26, 2007 in U.S. Appl. No. 11/290,203.
U.S. Official Action dated May 30, 2008 in U.S. Appl. No. 11/290,203.
U.S. Official Action dated Oct. 16, 2008 in U.S. Appl. No. 11/290,203.
U.S. Official Action dated Jun. 23, 2009 in U.S. Appl. No. 11/290,203.
U.S. Official Action dated Sep. 17, 2008 in U.S. Appl. No. 11/290,226.
U.S. Official Action dated Jun. 23, 2009 in U.S. Appl. No. 11/290,226.
U.S. Official Action dated Sep. 19, 2008 in U.S. Appl. No. 11/290,231.
U.S. Official Action dated May 13, 2009 in U.S. Appl. No. 11/290,231.
U.S. Official Action dated Oct. 31, 2008 in U.S. Appl. No. 11/395,088.
U.S. Official Action dated Jun. 24, 2009 in U.S. Appl. No. 11/395,088.
U.S. Official Action dated Oct. 30, 2008 in U.S. Appl. No. 11/446,091.
U.S. Official Action dated Apr. 27, 2009 in U.S. Appl. No. 11/446,091.
U.S. Official Action dated Sep. 23, 2008 in U.S. Appl. No. 12/045,329.
U.S. Official Action dated Jul. 8, 2009 in U.S. Appl. No. 12/045,329.
U.S. Official Action dated Apr. 30, 2009 in U.S. Appl. No. 12/111,569.
U.S. Appl. No. 09/750,000, filed Dec. 29, 2000, Inventors: Frank et al., entitled "System and Method for Managing Intellectual Property".
U.S. Appl. No. 09/750,001, filed Dec. 29, 2000, Inventors: Frank et al., entitled "System and Method for Marketing, Managing, and Maintaining Intellectual Property".
U.S. Appl. No. 09/750,012, filed Dec. 29, 2000, Inventors: Frank et al., entitled "System and Method for Developing and Implementing Intellectual Property Marketing".
U.S. Appl. No. 09/750,136, filed Dec. 29, 2000, Inventors: Frank et al., entitled "System and Method for Managing Intellectual Property Life Cycles".
U.S. Appl. No. 10/004,497, filed Dec. 6, 2001, Inventors: Frank et al., entitled "System and Method for Developing and Implementing Intellectual Property Marketing".
U.S. Official Action dated Nov. 25, 2009 in U.S. Appl. No. 11/289,859.
U.S. Notice of Allowance / Allowability dated Nov. 18, 2009 in U.S. Appl. No. 11/290,203.
U.S. Notice of Allowance / Allowability dated Nov. 16, 2009 in U.S. Appl. No. 11/290,226.
U.S. Notice of Allowance / Allowability dated Dec. 7, 2009 in U.S. Appl. No. 11/290,231.
U.S. Official Action dated Dec. 16, 2009 in U.S. Appl. No. 11/395,088.
U.S. Notice of Allowance / Allowability dated Nov. 16, 2009 in U.S. Appl. No. 11/446,091.
U.S. Official Action dated Jan. 6, 2010 in U.S. Appl. No. 12/013,196.
U.S. Notice of Allowance / Allowability dated Nov. 16, 2009 in U.S. Appl. No. 12/045,329.
U.S. Notice of Allowance / Allowability dated Dec. 14, 2009 in U.S. Appl. No. 12/111,569.
U.S. Notice of Allowance / Allowability dated Jul. 9, 2010 in U.S. Appl. No. 11/289,859.
U.S. Notice of Allowance / Allowability dated May 14, 2010 in U.S. Appl. No. 11/290,203.
U.S. Notice of Allowance / Allowability dated May 7, 2010 in U.S. Appl. No. 11/290,226.
U.S. Notice of Allowance / Allowability dated Apr. 28, 2010 in U.S. Appl. No. 11/290,231.
U.S. Official Action dated Sep. 1, 2010 in U.S. Appl. No. 11/395,088.
U.S. Official Action dated Feb. 2, 2010 in U.S. Appl. No. 12/111,558.
U.S. Notice of Allowance / Allowability dated May 14, 2010 in U.S. Appl. No. 12/111,569.
U.S. Notice of Allowance / Allowability dated Sep. 16, 2010 in U.S. Appl. No. 12/013,196.

* cited by examiner

INFRINGER FINDER

CROSS-REFERENCE TO RELATED APPLICATIONS

This application: is a continuation-in-part of application Ser. No. 10/188,209, filed Jul. 3, 2002, now U.S. Pat. No. 7,386,460 which is a continuation of application Ser. No. 10/004,497, filed Dec. 6, 2001, now abandoned which is a continuation of application Ser. No. 09/750,012 filed Dec. 29, 2000 now abandoned, all of which claimed the benefit of U.S. Provisional Application No. 60/192,862 filed Mar. 29, 2000, and U.S. Provisional Application No. 60/173,919, filed Dec. 30, 1999; and is also a continuation-in-part of application Ser. No. 09/750,154, filed Dec. 29, 2000, now U.S. Pat. No. 7,346,518 which claimed the benefit of U.S. Provisional Application No. 60/192,862 filed Mar. 29, 2000, and U.S. Provisional Application No. 60/173,919, filed Dec. 30, 1999; and is also a continuation-in-part of application Ser. No. 09/946,457, filed Sep. 6, 2001, now U.S. Pat. No. 7,389,239 which is a continuation of application Ser. No. 09/750,000, filed Dec. 29, 2000, now abandoned all of which claimed the benefit of U.S. Provisional Application No. 60/192,862 filed Mar. 29, 2000, and U.S. Provisional Application No. 60/173,919, filed Dec. 30, 1999; and is also a continuation-in-part of application Ser. No. 09/750,130, filed Dec. 29, 2000, now U.S. Pat. No. 7,127,405 which claimed the benefit of U.S. Provisional Application No. 60/192,862 filed Mar. 29, 2000, and U.S. Provisional Application No. 60/173,919, filed Dec. 30, 1999; and is also a continuation-in-part of application Ser. No. 09/750,001, filed Dec. 29, 2000, now U.S. Pat. No. 7,801,830 which claimed the benefit of U.S. Provisional Application No. 60/192,862 filed Mar. 29, 2000, and U.S. Provisional Application No. 60/173,919, filed Dec. 30, 1999; and is also a continuation-in-part of application Ser. No. 09/946,593, filed Sep. 6, 2001, now U.S. Pat. No. 7,406,425 which is a continuation of application Ser. No. 09/750,136, filed Dec. 29, 2000, now abandoned all of which claimed the benefit of U.S. Provisional Application No. 60/192,862 filed Mar. 29, 2000, and U.S. Provisional Application No. 60/173,919, filed Dec. 30, 1999.

TECHNICAL FIELD

The present disclosure is generally related to targeted searching of public sources of information.

BACKGROUND

Finding instances of patent infringement is a difficult and time consuming process, particularly for companies with large patent portfolios, with many potential infringers, or covering very futuristic concepts. The wealth of information available in public information sources may provide useful information regarding potential patent infringers. Many companies use experts in the particular technology field and outside firms to assist in identifying patent infringers. However, this process can be expensive, as well as difficult. The potential exists for many patent infringers to remain undetected.

Therefore, there is a need for systems and methods that address these and/or other perceived shortcomings.

SUMMARY

The present disclosure provides systems and methods for an infringer finder to search public information sources for possible patent infringers. Some embodiments provide for analyzing an issued patent, associated patent support data, such as Patent and Trademark Office (PTO) information, and other reference materials, along with user input to create a patent search profile. Using the patent search profile, a search is made of public information sources and a report is generated summarizing possible patent infringement targets.

Other systems, methods, and/or computer program products according to embodiments will be or become apparent to one with skill in the art upon review of the following drawings and detailed description. It is intended that all such additional systems, methods, and/or computer program products be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
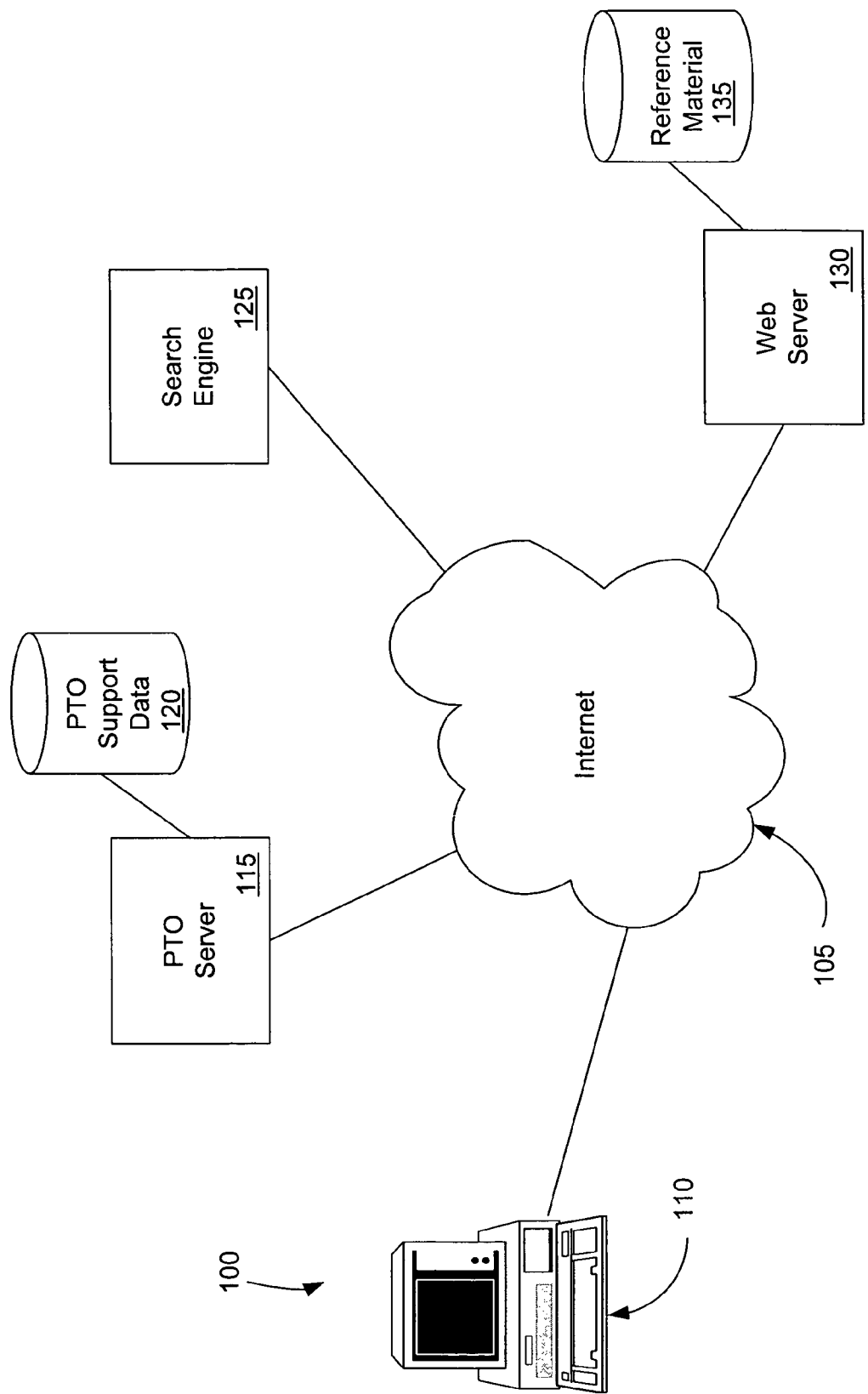
FIG. 1 is a block diagram of a system for finding patent infringers according to an exemplary embodiment.

Reference is now made in detail to the description of the embodiments as illustrated in the drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

The present disclosure provides systems and methods for an infringer finder to search public information sources for possible patent infringers. FIG. 1 is a block diagram of one embodiment of the system 100 for searching public information sources to find potential patent infringers. As shown in FIG. 1, in one embodiment, an infringer finder system 100 resides in one or more general purpose computers 110 that are coupled to a source of public information, e.g., a PTO server 115, a search engine 125, and a web server 130 over a network such as the Internet 105.

In the operating environment shown in FIG. 1, a user of a general purpose computer accesses one or more sources of public information such as PTO information and PTO support data 120 stored in a database, reference materials 135 stored in one or more databases, and information from search engines 125 (including web crawlers and other search logic)

over a network such as the Internet 105. The system 100 can be implemented in software, firmware, hardware, or a combination thereof. According to an exemplary embodiment, the system 100 is implemented in software, as an executable program, and is executed by a special or general purpose digital computer 110, such as a personal computer, workstation, minicomputer, or mainframe computer. When implemented in software, the system 100 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of exemplary embodiments in logic embodied in hardware or software-configured mediums.

Figure 2:
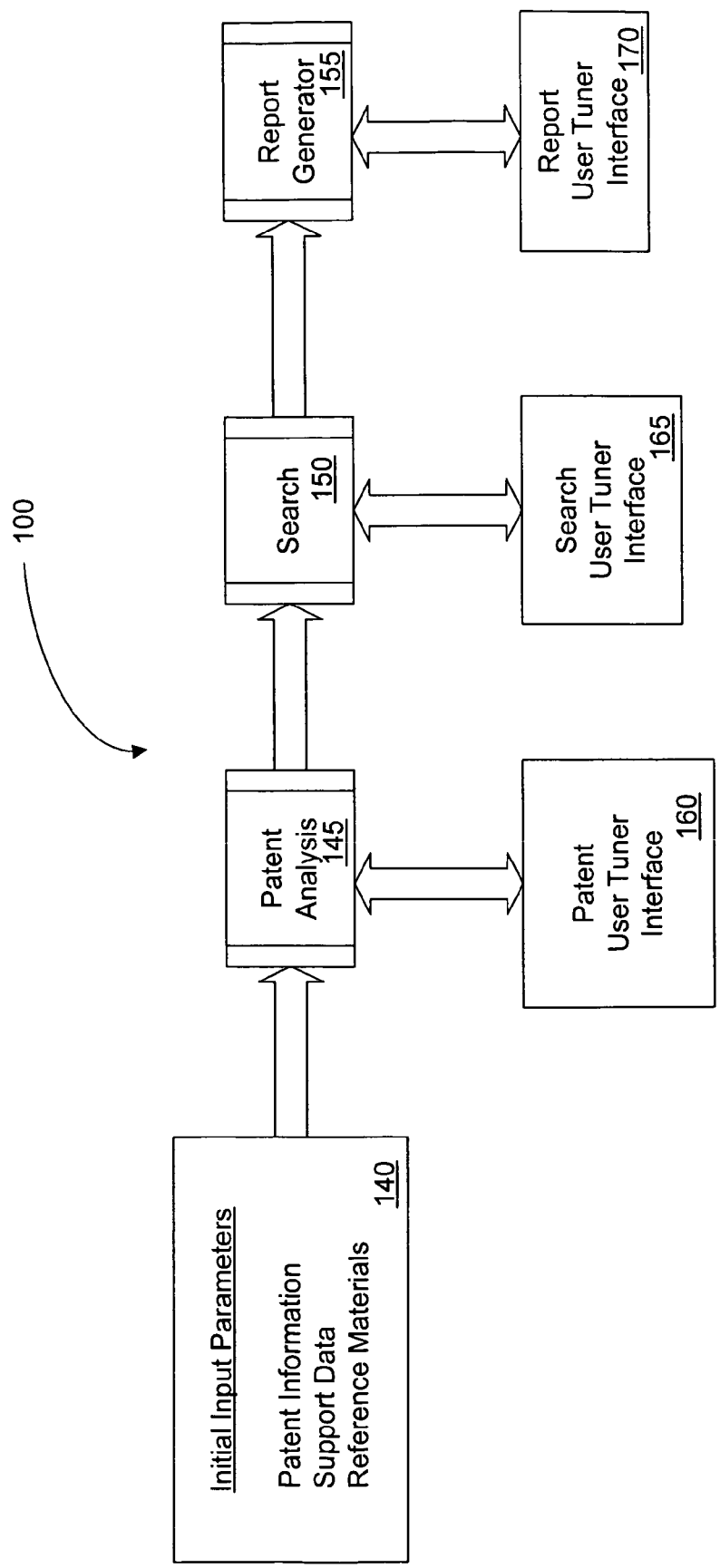
FIG. 2 is a flow diagram of a system for finding patent infringers according to an exemplary embodiment.

FIG. 2 is a flow diagram of one embodiment of the system 100 for searching public information sources to find potential patent infringers. As shown in FIG. 2, the system 100 comprises initial input parameters 140, a patent analysis module 145, a patent user tuner interface 160, a search module 150, a search user tuner interface 165, a report generator module 155, and a report user tuner interface 170. According to an exemplary embodiment, the search module 150 provides access to sources of public information, for example, via Internet services.

Figure 4:
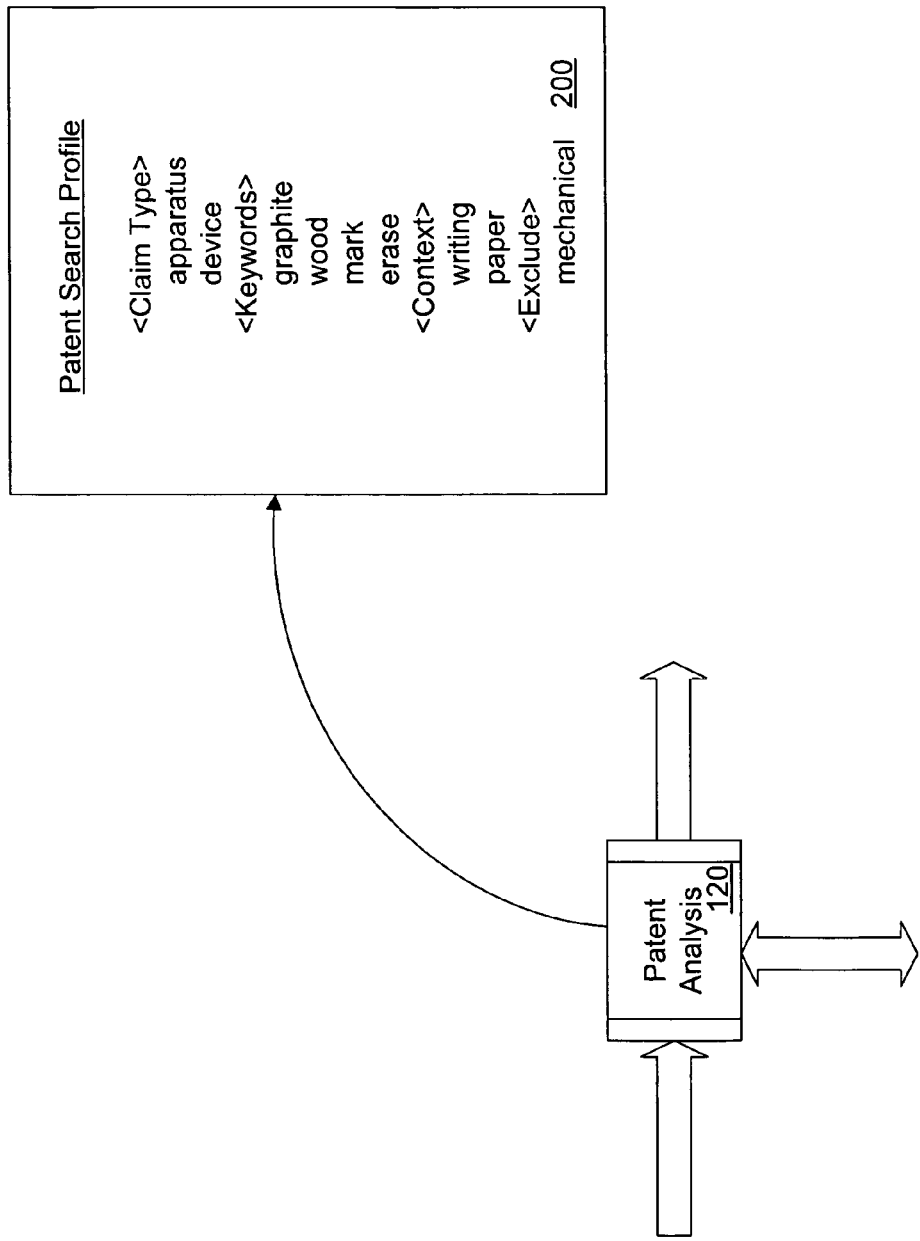
FIG. 4 is a representative patent search profile as created by the patent analysis module of FIG. 2.

The patent analysis module 145 creates a patent search profile 200. The patent search profile 200 is shown in FIG. 4 and is discussed in greater detail below. The patent analysis is based on initial input parameters 140 and/or user input received from the patent user tuner interface 160. The patent analysis module 145 will create the patent search profile 200 based on the information gleaned from the initial input parameters 140 and from user input.

As shown in FIG. 2, the patent analysis module 145 requires initial input parameters 140: (1) patent information, (2) support data, and (3) reference materials. Patent information is that information gleaned from a patent granted by the United States Patent and Trademark Office (PTO). Patent information may be considered to include information contained within the patent. Examples of patent information are the abstract, the specification, the claims, and the drawings. Patent support data may be considered to include information contained within the prosecution history of the patent. Examples of support data, or associated PTO information, are any PTO office actions, any other granted patent or published patent application that is cited within the issued patent, other issued patents, applications for patent or other documents (paper and/or electronic) that cite the patent at issue, and PTO classification information. Examples of reference materials include dictionaries, encyclopedias, electronic legal research tools (e.g., NexisLexis and Westlaw), an image/picture library, a video library, a sound library, a music library, and business sources.

The patent analysis module 145 may also receive user input, referred to as patent analysis factors 161, through the patent user tuner interface 160. The patent user tuner interface 160 is discussed in greater detail below. User input may include many terms or fields that may be relevant to a particular invention. The patent user tuner interface 160 also allows the capability to inspect or view the patent search profile 200 prior to any search that may occur. A user may also specify that a search is to proceed without inspecting or viewing the patent search profile 200.

Upon inspection of the patent search profile 200, a user may modify the patent analysis factors 161 or allow the search to proceed. The patent user tuner interface 160 also allows the user to delete information from the patent search profile 200, after which the search may be allowed to proceed or the patent analysis module 145 may refine the patent search profile 200 based on the newly excluded information. Of course, new input may also be added to further refine the patent search profile 200.

The patent analysis module 145 will analyze the various input received from among the patent information, support data, reference materials, and/or the patent user tuner interface 160 to create the patent search profile 200. Analysis may be performed, e.g., based on claim type, keywords, context analysis, structure of the claim for identifying dependencies, similar and opposite meaning interpretation of the claim language, dictionary meaning, claim modification, office actions, and prior art, among others. According to exemplary embodiments, analysis may begin with the particular claim type. For example, if the invention were a pencil, the claim type might be an apparatus or article of manufacture as well as a method. Of course, for different inventions, claim types could be a system, a process, or a computer readable medium, for example.

Analysis may also involve parsing keywords from the claims. The patent analysis module 145 may perform context analysis of words or phrases that appear in the claims. As an example, the terms graphite, composition, and wood might appear in a claim for a pencil. These terms appearing in close proximity to each other could be a useful ingredient to a patent search profile 200. If a particular claim contains a large number of keywords, then some percentage of those terms appearing together might be an interesting item to search for. The patent analysis module 145 could specify, for example, that finding any five of the seven keywords would be a relevant find. Further, the patent analysis module 145 may analyze the structure of the claim for identifying dependencies. For example, if claim 2 contains "The system as in claim 1 . . . " then relevant keywords from both claims 1 and 2 may be considered together.

Context analysis may also extend to similar and opposite meaning interpretation of the claim language. For example, the patent analysis module 145 may compare the claim language to the specification language to determine the proper context. Dictionary meanings of words may also be incorporated into the analysis. For the patent analysis module 145, artificial intelligence and fuzzy logic could be utilized to effect rule-based analysis.

Further, the context analysis by the patent analysis module 145 may extend to claim modifications, office actions, and prior art. Claim modifications may occur due to amendments during the prosecution of the patent application. Exclusion of certain words or phrases from the claim, as well as additions of words or phrases to the claim may be relevant in creating a patent search profile 200. Analyzing any office actions as well as prior art or other documents/public information cited in an office action or the patent application itself could also provide useful input to the patent search profile 200.

Finally, the patent analysis module 145 may incorporate the patent analysis factors 161 deemed relevant via user input through the patent user tuner interface 160. Utilizing concepts of fuzzy logic or artificial intelligence, any of the relevant patent analysis factors 161 may be marked for inclusion or exclusion, any of the patent analysis factors 161 may be marked as conditional, or any manner of rule-based decision-making could be employed. For example, a particular company, such as the Eagle Pencil Co., could be included (or excluded) as a patent analysis factor 161 only if a particular technology, such as wooden pencils, is present as a patent analysis factor 161. A further limitation could be that the technology does not include mechanical pencils.

As shown in FIG. 2, the search module 150 accepts the output from the patent analysis module 145 as the input for search operations. The search module 150 utilizes the input, patent search profile 200, to search public sources of information for potential patent infringers. The search may be performed via search engine, web crawler, robot, or other search technology. According to an exemplary embodiment, the search module 150 has access to public sources of information. An example of such access would be Internet connections to various databases, servers, or other information sources. The patent search results are provided to the report generator module 155. Hits are defined according to the confidence level of the match, and the accuracy level as specified by the user.

The search module 150 may receive user input, search factors 166, via the search user tuner interface 165 as shown in FIG. 2. The search factors 166 are discussed in greater detail below. The search user tuner interface 165 also allows the capability to inspect or view the patent search results prior to submitting them to the report generator module 155. Generation of the report may also proceed without any inspection or viewing of the patent search results. The patent search profile 200 could also be inspected, viewed or modified, as previously, if the patent search results are deemed inadequate.

Figure 7:
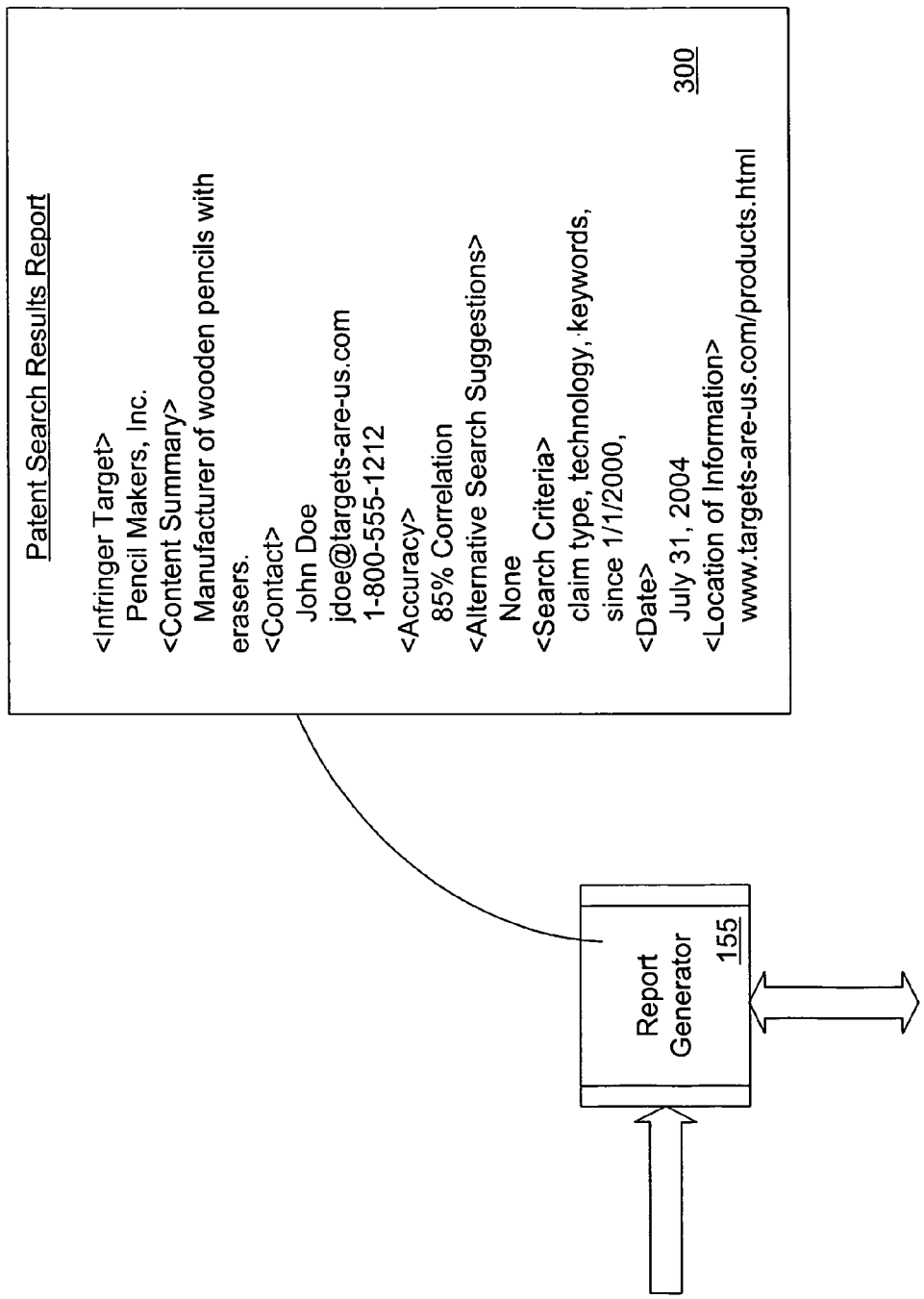
FIG. 7 is a representative sample of a report provided by the infringer finder of FIG. 2.

As also shown in FIG. 2, the report generator module 155 receives the patent search results from the search module 150 as input and prepares the patent search results report 300. An example of a patent search results report 300 is shown in FIG. 7 and is discussed in greater detail below. The report generator module 155 may receive user input, report factors 171, via the report user tuner interface 170 shown in FIG. 2. The report user tuner interface 170 also allows the capability to inspect or view the patent search results report 300. The patent search profile 200 could also be inspected, viewed or modified, as previously, if the results are deemed inadequate.

Figure 3:
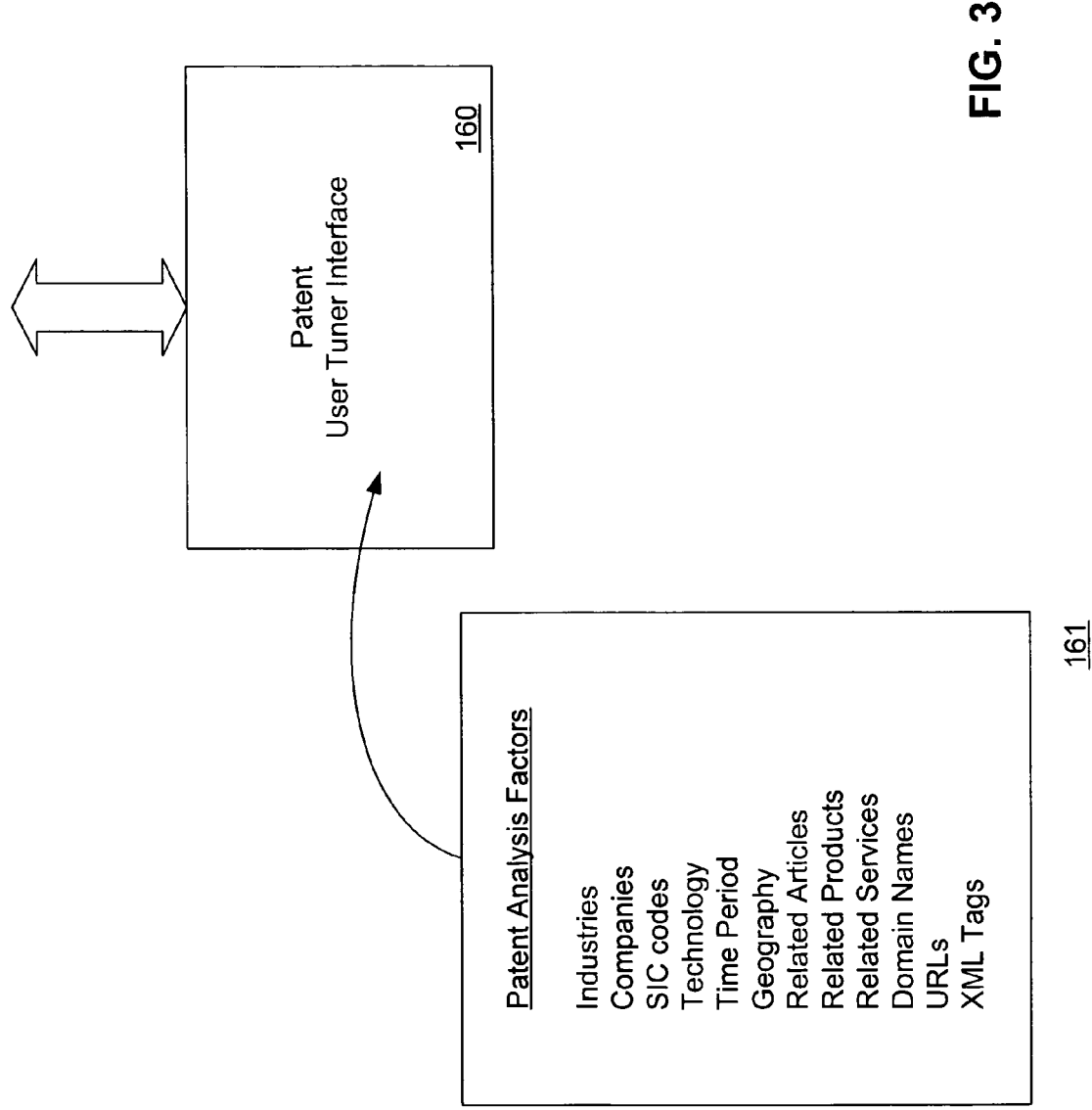
FIG. 3 is a representative sample of patent analysis factors for the patent user tuner interface of FIG. 2.

The patent user tuner interface 160, shown in FIG. 3, allows a user to provide input, patent analysis factors 161, to the patent analysis module 145. Example patent analysis factors 161 include industries, companies, Standard Industrial Classification (SIC) codes, technology, time period, geography, related articles, related products, related services, domain names, URLs, and XML tags. User input may include many terms or fields that may be relevant to a particular invention. The patent user tuner interface 160 also allows the capability to inspect or view the patent search profile 200 prior to any search that may occur. A user may also specify that a search is to proceed without inspecting or viewing the patent search profile 200.

An exemplary patent search profile 200, as created by the patent analysis module 145, is shown in FIG. 4. The patent analysis is based on initial input parameters 140 and/or patent analysis factors 161 (user input) received from the patent user tuner interface 160. The patent search profile 200 includes information or terms that may be relevant when searching for possible infringement. As an example, if the invention is a pencil, then relevant terms might include "graphite", "wood", "writing", "mark", "paper", and "eraser". For a mechanical pencil, the terms "mechanical" and "click" might also be relevant. Other relevant terms might include potential manufacturers or companies, or SIC codes. The patent search profile 200 is created based on the analysis of information gleaned from the initial input parameters 140 and from the patent analysis factors 161.

Figure 5:
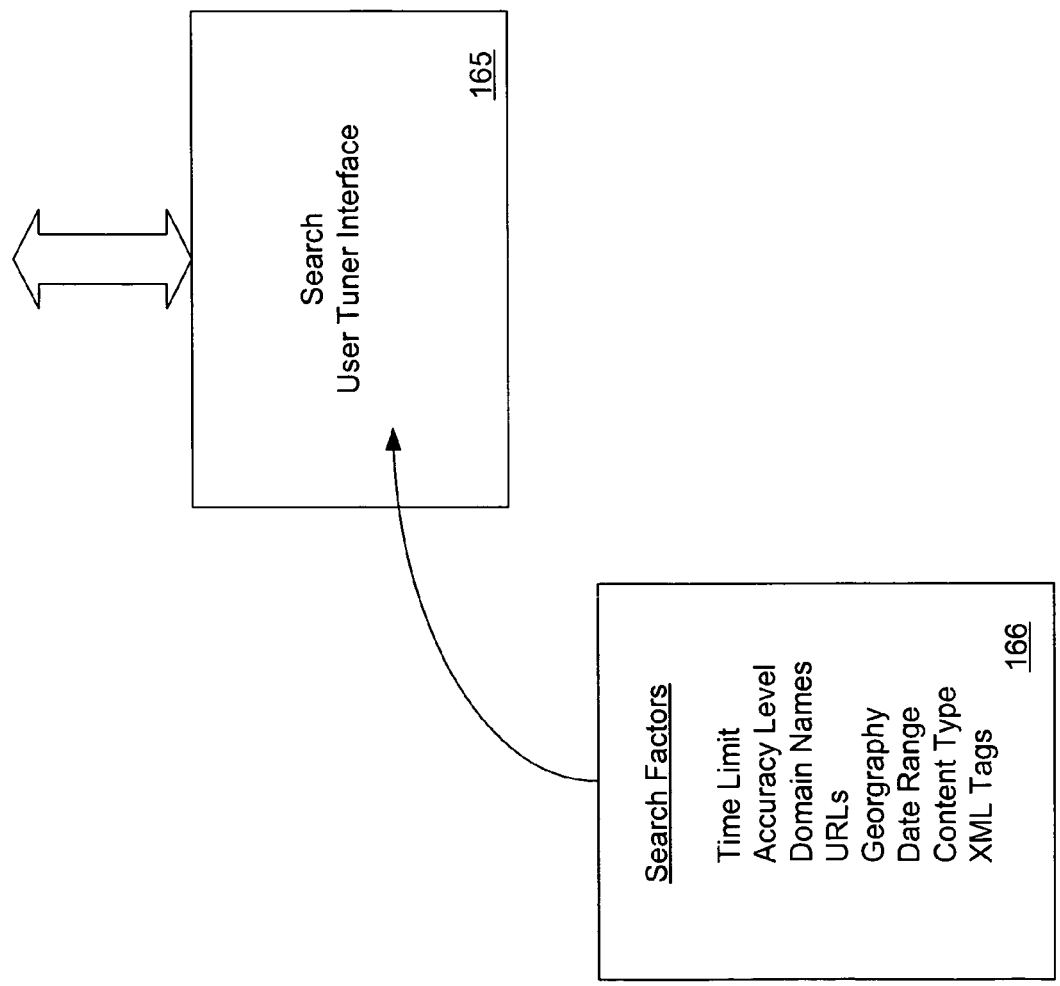
FIG. 5 is a representative sample of search factors for the search user tuner interface of FIG. 2.

As shown in FIG. 5, the search module 150 may receive user input, search factors 166, via the search user tuner interface 165. Example search factors 166 include duration, schedule, accuracy, domain names, URLs, geography, date range, content type, and XML tags. Specifying duration provides a limit for how long the search will operate. The user may also provide a schedule for the search. For example, the search might be continuous or periodic. As a further example, a periodic search could be scheduled quarterly, or once every six months, among others. The cost of the search may also be a consideration and could be limited. For example, a dollar cost limit to the search could be specified, e.g., a cost limit in terms of dollars per CPU time, dollars per hit, dollars per search, among other type cost factors. A desired accuracy level may also be provided for the search results. For example, a user may be willing to tolerate a certain amount of false positives in the search results rather than accept the risk of missing potential infringers. Also web domains and specific URLs may be specified for the search. The search could be limited by geography, e.g., American companies, east coast, etc., or by a date range, e.g., web pages created after a certain date, before a certain date, or between two dates. Content type could be specified also; example types may include text, image, video, and sound. As with the patent analysis factors 161, any combination of these or other search factors 166 could be prescribed. Further any of the search factors 166 could be specifically included, excluded or conditional on the presence, absence or value of other search factors 166.

Additionally, it should be noted that statistical methods could be used by the system 100 to evaluate the likelihood of infringement by any infringer target identified by the system 100. User input, via the search user tuner interface 165, could identify levels of correlation that would indicate a likelihood of infringement. For example, presence of a certain percentage of keywords in conjunction with a desired level of accuracy, or a certain confidence level in search hits might signify a higher likelihood that the target is an infringer.

Figure 6:
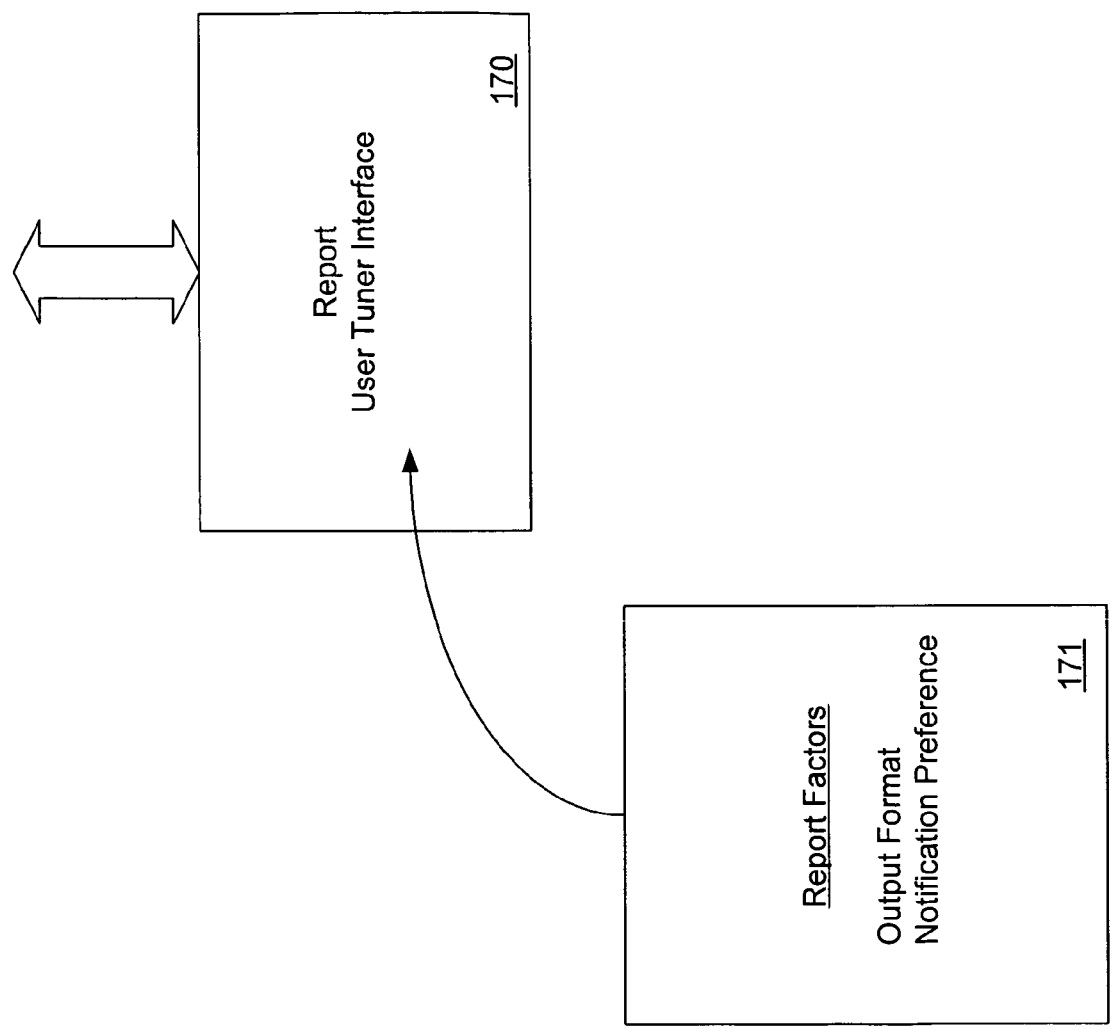
FIG. 6 is a representative sample of report factors for the report user tuner interface of FIG. 2.

As shown in FIG. 6, examples of report factors 171 are (1) report format and (2) notification preference. The report format could include type of document (ASCII, Word, WordPerfect, Excel, etc.) requirements, for example. Notification preference could be email, pager, and/or instant messaging, for example.

The report generator module 155 utilizes the report factors 171 and the search results from the search module 150 to create a patent search results report 300 as shown in FIG. 7. The patent search results report 300 provides information about infringer targets, content, contact information, accuracy rating, alternative search suggestions, search criteria used, date of information, and location of information. Possible infringers are identified as infringer target(s). Additional description of an infringer target may also be provided. A summary of the content relating to the infringer target, or if necessary the complete content, could also be provided. This could include contact information, addresses, phone numbers, email addresses, URLs, description of the business, financial data, etc. The accuracy level of the information may be provided. The patent search results report 300 may also provide the search criteria that was used, the date of the search, and the date of the information itself. The location or source of the information may also be provided.

Figure 8:
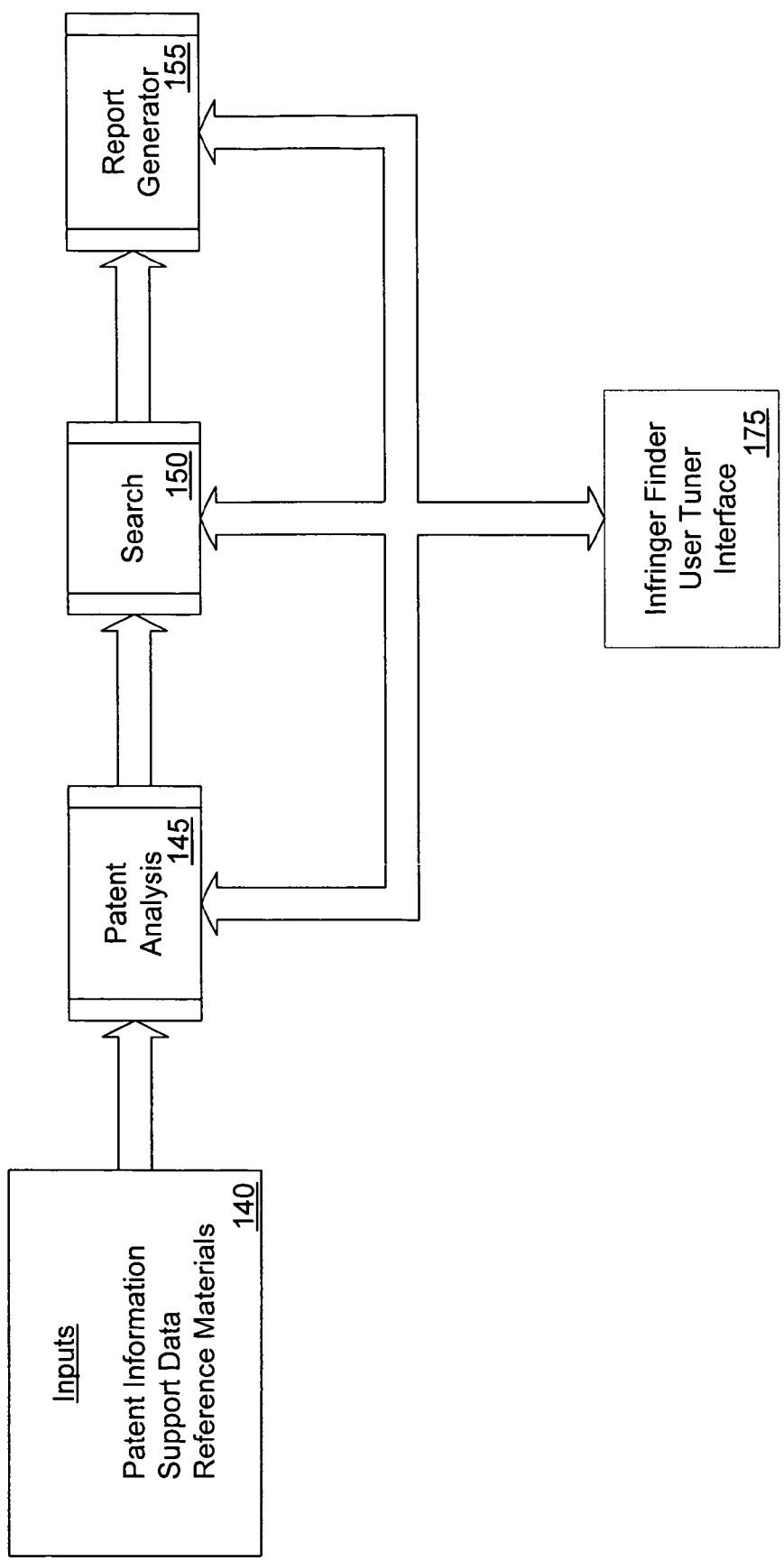
FIG. 8 is a diagram of a system for finding patent infringers with one infringer finder user tuner interface according to an exemplary embodiment.

As shown in FIG. 8, the patent analysis user tuner interface 160, the search user tuner interface 165, and the report user tuner interface 170, could collectively be replaced by one infringer finder user tuner interface 175. The infringer finder user tuner interface 175 could provide an interface to the patent analysis module 145, the search module 150, and the report generator module 155. The infringer finder user tuner interface 175 would allow for inspection and/or modification of the patent search profile 200, the patent search results, and the patent search results report 300 to accept the results or refine the inputs to obtain adequate results.

Finally, it should be noted that the system 100 could also be used to search public information sources for prior art. As an example, an infringer target identified by the system 100 would possess similar technology to the particular invention or patent information identified as an initial input parameter 140. Similar technology existing at an earlier date than the proposed invention might qualify as prior art. Thus, specifying a date range for the search that is earlier than the date at which the proposed invention came into existence would potentially result in relevant prior art. In another embodiment, instead of using patent information, e.g., a patent granted by the PTO, as an input to the system 100, a patent application could serve as an initial input parameter 140. The system 100 output would not only include commercial product descriptions and product announcements, but could include research papers, general documents, news articles, presentations, and patents, among others, that relate to the patent application or to the drafted claims. In other embodiments, a published application or a draft application, among others, could serve as an initial input parameter 140.

It should be emphasized that the above-described embodiments of the present disclosure, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure.

Therefore, having thus described the disclosure, at least the following is claimed:

1. A method utilizing a computer for finding patent infringers, comprising:
   receiving patent information related to at least one patent, associated patent support data relating to the patent information, and reference materials;
   analyzing the patent information, the associated patent support data relating to the patent information, and the reference materials;
   creating a patent search profile based at least in part on analysis of the patent information, the associated patent support data relating to the patent information, and the reference materials, the patent search profile at least including keywords associated with the at least one patent;
   analyzing claim structure of the at least one patent to determine a dependency relationship among at least two claims of the at least one patent;
   based on analysis of the claim structure of the at least one patent, utilizing the keywords of the patent search profile determined to be included in the at least two claims having the dependency relationship together when conducting a search for the patent infringers;
   searching sources of public information utilizing the patent search profile for the patent infringers of the at least one patent and providing patent search results identifying the patent infringers of the at least one patent; and
   generating a patent search results report.

2. The method of claim 1, further comprising analyzing the patent search profile, the patent information, the associated patent support data relating to the patent information, and the reference materials, to create a new patent search profile, and wherein the searching utilizes previous patent search results.

3. The method of claim 1, wherein the patent information includes first information included in the at least one patent, the patent support data includes second information included in a prosecution history of the at least one patent, and the reference materials include other public information.

4. The method of claim 1,
   wherein creating the patent search profile utilizes factors comprising:
      claim type;
      parsed keywords;
      context analysis;
      similar and opposite meaning interpretation of claim language;
      dictionary meaning;
      analysis of claim modification;
      analysis of office actions;
      analysis of prior art; and
      analysis of other documents cited during patent prosecution; and
   further comprising specifying patent analysis user tuner interface factors comprising at least one of:
      industries;
      companies;
      standard industrial classification codes;
      technology;
      time period;
      geography;
      related articles;
      related products;
      related services;
      domain names;
      uniform resource locators; and
      extensible markup language tags;
   wherein creating the patent search profile utilizes the patent analysis user tuner interface factors.

5. The method of claim 1, wherein searching the sources of public information utilizes at least one of:
   a search engine; and
   a web crawler;

and further comprising specifying search user tuner interface factors comprising at least one of:
- duration;
- schedule;
- cost;
- accuracy level;
- domain names;
- uniform resource locators;
- geography;
- date range;
- content type; and
- extensible markup language tags;
- wherein searching the sources of public information utilizes the search user tuner interface factors.

6. The method of claim 1, further comprising specifying report user input factors comprising at least one of:
- output format; and
- notification preference;
- wherein generating the patent search results report utilizes the report user input factors and creates the patent search results report comprising at least one of:
- infringer targets;
- content;
- contact information;
- accuracy rating;
- alternative search suggestions;
- search criteria used;
- date of information; and
- location of information.

7. A system for utilizing a computer for finding infringement of at least one patent, the system comprising:
- a memory device for storing a program for finding infringement of the at least one patent; and
- a processor, functionally coupled to the memory device, the processor being responsive to computer-executable instructions contained in the program and operative to:
  - receive patent information related to the at least one patent, associated patent support data relating to the patent information, and reference materials,
  - analyze the patent information, the associated patent support data relating to the patent information, and the reference materials,
  - create a patent search profile based at least in part on analysis of the patent information, the associated patent support data relating to the patent information, and the reference materials, the patent search profile at least including keywords associated with the at least one patent,
  - analyze claim structure of the at least one patent to determine a dependency relationship among at least two claims of the at least one patent,
  - based on analysis of the claim structure of the at least one patent, utilize the keywords of the patent search profile determined to be included in the at least two claims having the dependency relationship together when conducting a search for possible patent infringers,
  - utilize the patent search profile to conduct the search of sources of public information for the possible patent infringers of the at least one patent and to provide patent search results identifying possible patent infringement of the at least one patent, and
  - utilize the patent search results to provide a patent search results report.

8. The system of claim 7, wherein the processor is further operative to analyze the patent search profile, the patent information, the associated patent support data, and the reference materials, to create a new patent search profile, and wherein the processor is further operative to utilize previous patent search results.

9. The system of claim 7, wherein the patent information includes first information included in the at least one patent, the associated patent support data includes second information included in a prosecution history of the at least one patent, and the reference materials include other public information.

10. The system of claim 7, wherein the processor is further operative to create the patent search profile based on factors comprising:
- claim type;
- parsed keywords;
- context analysis;
- similar and opposite meaning interpretation of claim language;
- dictionary meaning;
- analysis of claim modification;
- analysis of office actions;
- analysis of prior art; and
- analysis of other documents cited during patent prosecution;
- the system further comprising a patent analysis user tuner interface operable to specify patent analysis factors comprising at least one of:
  - industries;
  - companies;
  - standard industrial classification codes;
  - technology;
  - time period;
  - geography;
  - related articles;
  - related products;
  - related services;
  - domain names;
  - uniform resource locators; and
  - extensible markup language tags
- wherein the processor utilizes the patent analysis factors to create the patent search profile.

11. The system of claim 7, wherein the processor utilizes at least one of:
- a search engine; and
- a web crawler;
- the system further comprising a search user tuner interface to specify search factors for use by the processor, the search factors comprising at least one of:
  - duration;
  - schedule;
  - cost;
  - accuracy level;
  - domain names;
  - uniform resource locators;
  - geography;
  - date range;
  - content type; and
  - extensible markup language tags.

12. The system of claim 7, further comprising a report user tuner interface to specify report factors comprising at least one of:
- output format; and
- notification preference;
- wherein the processor utilizes the report factors to create the patent search results report comprising at least one of:
  - infringer targets;
  - content;

contact information;
accuracy rating;
alternative search suggestions;
search criteria used;
date of information; and
location of information.

13. A computer readable storage medium having computer-executable instructions stored thereon which, when executed by a computer, cause the computer to:
receive patent information related to at least one patent, associated patent support data relating to the patent information, and reference materials;
analyze the patent information, the associated patent support data relating to the patent information, and the reference materials;
create a patent search profile based at least in part on analysis of the patent information, the associated patent support data relating to the patent information, and the reference materials, the patent search profile at least including keywords associated with the at least one patent;
analyze claim structure of the at least one patent to determine a dependency relationship among at least two claims of the at least one patent;
based on analysis of the claim structure of the at least one patent, utilize the keywords of the patent search profile determined to be included in the at least two claims having the dependency relationship together when conducting a search for possible patent infringers;
search sources of public information, utilizing the patent search profile, for the possible patent infringers of the at least one patent and providing patent search results identifying the possible patent infringers of the at least one patent; and
generate a patent search results report.

14. The computer readable storage medium of claim 13 having further computer-executable instructions stored thereon which, when executed by a computer, cause the computer to analyze the patent search profile, the patent information, the associated patent support data relating to the patent information, and the reference materials, to create a new patent search profile, and wherein the searching utilizes previous patent search results.

15. The computer readable storage medium of claim 13, wherein the patent information includes all information included in the at least one patent, the patent support data includes information included in a prosecution history of the at least one patent, and the reference materials include other public information.

16. The computer readable storage medium of claim 13, wherein creating the patent search profile utilizes factors comprising:
claim type;
parsed keywords;
context analysis;
similar and opposite meaning interpretation of claim language;
dictionary meaning;
analysis of claim modification;
analysis of office actions;
analysis of prior art; and
analysis of other documents cited during patent prosecution;
and wherein the computer readable storage medium has further computer-executable instructions stored thereon which, when executed by a computer, cause the computer to specify patent analysis user tuner interface factors comprising at least one of:
industries;
companies;
standard industrial classification codes;
technology;
time period;
geography;
related articles;
related products;
related services;
domain names;
uniform resource locators; and
extensible markup language tags;
wherein creating the patent search profile utilizes the patent analysis user tuner interface factors.

17. The computer readable storage medium of claim 13, wherein searching the sources of public information utilizes at least one of:
a search engine; and
a web crawler;
and wherein the computer readable storage medium has further computer-executable instructions stored thereon which, when executed by a computer, cause the computer to specify search user tuner interface factors comprising at least one of:
duration;
schedule;
cost;
accuracy level;
domain names;
uniform resource locators;
geography;
date range;
content type; and
extensible markup language tags;
wherein searching the sources of public information utilizes the search user tuner interface factors.

18. The computer readable storage medium of claim 13 having further computer-executable instructions stored thereon which, when executed by a computer, cause the computer to specify report user input factors comprising:
output format; and
notification preference;
wherein the computer readable storage medium has further computer-executable instructions stored thereon which, when executed by a computer, cause the computer to generate the patent search results report utilizing the report user input factors and create the patent search results report comprising at least one of:
infringer targets;
content;
contact information;
accuracy rating;
alternative search suggestions;
search criteria used;
date of information; and
location of information.

* * * * *